(12) United States Patent
Li et al.

(10) Patent No.: US 7,969,531 B1
(45) Date of Patent: Jun. 28, 2011

(54) INTEGRATED MULTI-FUNCTION LIGHT GUIDE FOR LCD BACKLIGHTING

(75) Inventors: Lin Li, St. Petersburg, FL (US); Israel J. Morejon, Tampa, FL (US); Jinhui Zhai, Oldsmar, FL (US); Evan O'Sullivan, Safety Harbor, FL (US)

(73) Assignee: Jabil Circuit, Inc., St. Petersburg, FL (US)

( * ) Notice: Subject to any disclaimer, the term of this patent is extended or adjusted under 35 U.S.C. 154(b) by 622 days.

(21) Appl. No.: 12/045,467

(22) Filed: Mar. 10, 2008

Related U.S. Application Data (60) Provisional application No. 60/893,792, filed on Mar. 8, 2007.

(51) Int. Cl.
*G02F 1/13357* (2006.01)
*F21V 8/00* (2006.01)

(52) U.S. Cl. .............. 349/65; 349/68; 349/95; 349/200; 362/612; 362/619

(58) Field of Classification Search .................... 349/61, 349/65, 68, 95, 200; 362/606, 609, 612, 362/613, 617, 619, 620, 621, 623; 425/363, 425/577; 359/619
See application file for complete search history.

(56) References Cited

U.S. PATENT DOCUMENTS

| | | | | |
|---|---|---|---|---|
| 5,054,888 A | * | 10/1991 | Jacobs et al. | 349/126 |
| 6,700,634 B2 | * | 3/2004 | Taniguchi et al. | 349/65 |
| 7,393,130 B2 | * | 7/2008 | Hasei | 362/619 |
| 2003/0146528 A1 | * | 8/2003 | Huang | 264/2.5 |
| 2004/0240777 A1 | * | 12/2004 | Woodgate et al. | 385/16 |
| 2007/0189039 A1 | * | 8/2007 | Yokota | 362/619 |

* cited by examiner

*Primary Examiner* — Dung T Nguyen
*Assistant Examiner* — Tai Duong
(74) *Attorney, Agent, or Firm* — Ronald E. Smith; Smith & Hopen, P.A.

(57) ABSTRACT

A backlighting apparatus for a flat panel LCD display includes an elongate light guide having a front wall through which travels polarized light in a direction toward the LCD display. An RGB LED set is positioned adjacent a first end wall of the light guide so that light enters the light guide from the first end wall. A retardation and reflection film covers respective external surfaces of the bottom wall and a second end wall. Microlenses are formed in the front wall along its extent and each microlens is filled with a birefringent material. Light emitted by the LED set travels through a collimated light coupling module and exits the light guide through the birefringent microlenses in polarized form toward the LCD display. The viewing angles and angular light distributions of the LCD display in vertical and horizontal directions are optimized for enhancing the brightness without involving DBEF and BEF.

18 Claims, 8 Drawing Sheets

INTEGRATED MULTI-FUNCTION LIGHT GUIDE FOR LCD BACKLIGHTING

CROSS-REFERENCE TO RELATED DISCLOSURES

This disclosure is a nonprovisional of U.S. provisional patent application No. 60/893,778, filed Mar. 8, 2007 by the present inventors under the same title. That disclosure is hereby incorporated by reference in its entirety into this disclosure.

1. FIELD OF THE INVENTION

This invention relates, generally, to backlight illumination of flat panel LCD displays. More particularly, it relates to such illumination performed by a very low number of light-emitting diodes with the capacity to control the viewing angle and to provide polarized light output by means of a light guide.

2. DESCRIPTION OF THE PRIOR ART

Backlighting of flat panel LCD displays is conventionally provided by a layered arrangement of parts. The outermost layer is the LCD panel that a viewer sees and the innermost layer is formed by a plurality of CCFLs (cold cathode fluorescent lamps) that provide backlight illumination. A layer of DBEF (dual brightness enhancement film) and two (2) layers of BEF (brightness enhancement film) are positioned between the LCD panel and the CCFLs to enhance the brightness. The DBEF and BEF are relatively expensive.

Such conventional structures produce non-polarized light rays distributed in a very large cone angle when DBEF and BEF are not involved. DBEF is used for polarization recycling and BEF (v) for angular light distribution management, i.e., to concentrate more light in the forward (toward the viewer) direction. A BEF (h) can be placed orthogonally to the BEF (v) to concentrate light across the perpendicular cross-section, thereby improving further the brightness. The use of both DBEF and BEF adds cost to the backlight unit and reduces system efficiency by causing light loss.

In the prior art, aluminum sub-wavelength grating (SWG) is disposed on a front (facing a viewer) wall of the light guide to provide polarized light output for a liquid crystal display. The SWG is a reflective polarizer and performs the polarization recycling function of DBEF. However, it is difficult to economically manufacture nano-scale features on the front wall of a PMMA light guide. Moreover, the SWG alone cannot control the light extraction angle so a BEF is still needed for angle management.

In another prior art structure, a surface-relief holographic grating is created on the front wall of the light guide to diffract light directly toward the LCD panel. Such a grating performs the function of a BEF but not a DBEF.

Still another prior art technique is to provide polarized light based upon use of a liquid crystalline polymer film that outputs polarized light within a small cone angle to enhance luminance in the direction of a viewer. However, the efficiency of this approach and its cost indicate that this is not the optimal approach. More particularly, a light guide equipped with such polymer film can only control angular light distribution in one direction so a BEF is still needed to manage the angular light distribution at its crossed direction.

It would therefore be advantageous if the DBEF and BEF could be eliminated for reducing the cost, improving the brightness and simplifying the backlight structure.

It would also be advantageous to eliminate the CCFLs because in addition to their expense they consume relatively large amounts of power.

Conventional LCD display panels use a large number of LEDS. Although one (1) LED is inexpensive and draws little power, the very large number of such LEDs results in a high expense and a substantial power requirement.

It would therefore be advantageous if the number of LEDS could be substantially reduced.

It would also be advantageous if the viewing angles of an LCD display in both vertical and horizontal directions could be controlled for enhancing the brightness and reducing the power consumption of the backlight unit.

The needed structure should also mix colors efficiently in a short distance.

However, in view of the prior art taken as a whole at the time the present invention was made, it was not obvious to those of ordinary skill how the identified needs could be fulfilled.

SUMMARY OF THE INVENTION

The long-standing but heretofore unfulfilled need for an improved apparatus for backlighting an LCD display panel is now met by a new, useful, and non-obvious invention.

Integrated light guides with a unique coupling concept provide polarized light output with controlled angular light distribution in two orthogonal directions for LED-based flat panel displays. The novel structure eliminates the DBEF and BEF used in conventional LCD backlighting units.

In the novel light guide of this invention, micro-groove structures filled with birefringent (double refraction) material are provided on the front wall of the light guide for polarized light output. The light extraction is based upon total internal reflection (TIR). It has high efficiency and works for all colors (frequencies) of light. The angular distribution of output light depends upon the curved or angular profiles of those microstructures and the index difference between the light guide material and the birefringent material. The divergent cone angle of the output beam in the direction perpendicular to the micro structure orientation is limited as desired and thus the brightness of the display is enhanced because the index difference is not very large. The propagation direction of the output beam is controlled to the normal direction of the LCD panel by proper design of the birefringent microlens structures. This eliminates the need for DBEF and one BEF.

This novel integrated light guide with birefringent microlens structure controls the angular light distribution in only one cross-section. A collimated light coupling controls the angular light distribution in a cross-section orthogonal to the cross-section controlled by the birefringent microlens structure, thereby eliminating the second BEF and improving the brightness of the display.

A primary object of the invention is to provide backlighting for flat panel LCD display that is free of cold cathode fluorescent lamps.

A more specific object is to eliminate the BEFs by controlling the viewing angle of the backlight unit in both vertical and horizontal directions by means of the structures in the light guide.

A more specific object is to provide such backlighting in polarized form.

A more specific object is to manufacture the multi-function light guide at low cost.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1A:
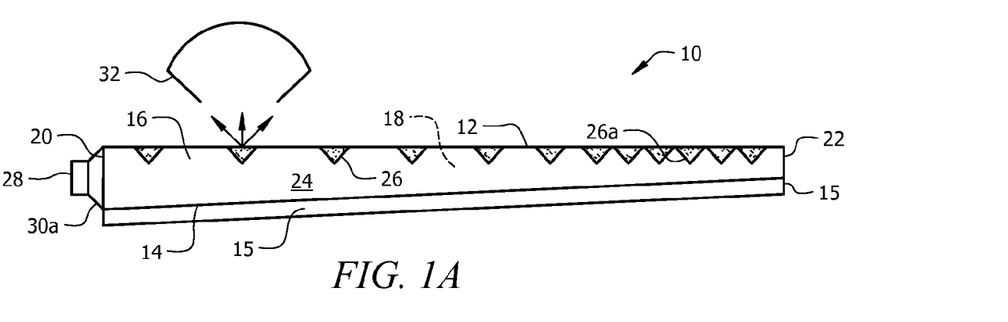
FIG. 1A is a top plan view of a novel tapered light guide having an RGB LED set positioned adjacent an end wall thereof.
Figure 1B:
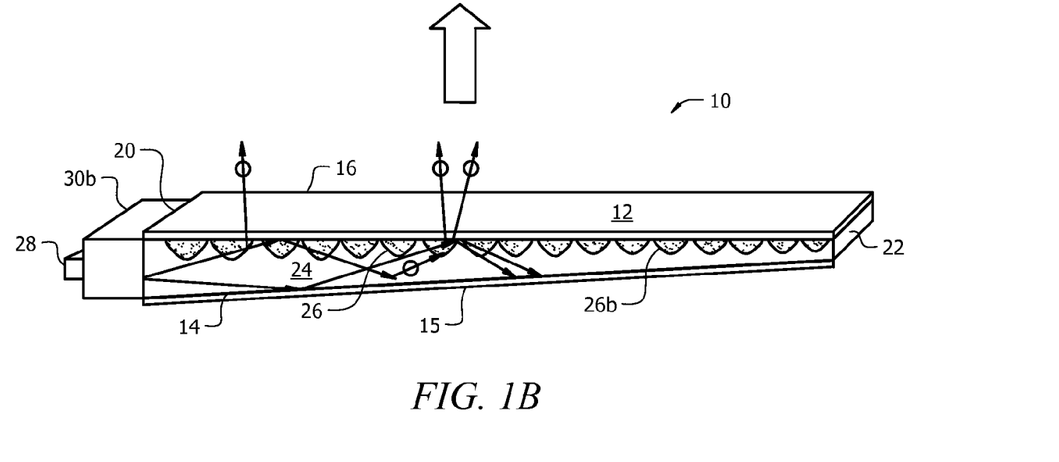
FIG. 1B is a perspective view of a novel tapered light guide having birefringent microlens on the front wall and a collimated light coupling positioned between an RGB LED set and an end wall of the light guide.
Figure 1C:
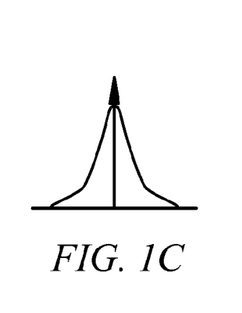
FIG. 1C is a diagrammatic representation of angular distribution of polarized light emitted by said light guide in horizontal direction.
Figure 1D:
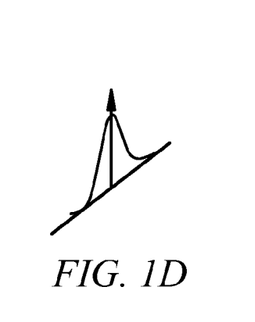
FIG. 1D is a diagrammatic representation of angular distribution of polarized light emitted by said light guide in a vertical direction.

Referring now to FIGS. 1A and 1B, it will there be seen that an illustrative embodiment of the invention is denoted as a whole by the reference numeral 10.

Elongate light guide 10 is a six-faced polyhedron and therefore includes a front wall 12, a back wall 14, top wall 16, bottom wall 18, and end walls 20, 22. In this first embodiment, back wall 14 is oblique with respect to front wall 12, i.e., the left end of back wall 14 is further from the left end of front wall 12 than the right end of back wall 14 is from the right end of front wall 12. A layer of retardation (QWP) and reflection film 15 is attached to back wall 14 and right end wall 22.

A plurality of microlenses, collectively denoted 26a in FIGS. 1A and 26b in FIG. 1B, is formed in front wall 12. As drawn in FIG. 1A, microlenses 26a from the left end of light guide 10 are spaced apart from one another by a predetermined distance, and such microlenses are closer together as they approach the right end of the light guide. The spacing of microlenses 26b in FIG. 1B may also differ as they approach end wall 22 of light guide 10. Each microlens 26a has a sawtooth structure as depicted in FIG. 1A and each microlens 26b has a curved structure as depicted in FIG. 1B.

Each microlens 26a, 26b is filled with birefringent (double refractive) material to form a birefringent microlens.

The size, shape and density of birefringent microlenses 26a, 26b on front wall 12 are designed to provide uniform brightness distribution across the screen.

An RGB LED set 28 is mounted to a first end of light guide 10. In this example, the RGB LED set is mounted to the left end of light guide 10. A light collection means 30a interconnects said RGB LED set 28 and end wall 20 of said light guide in the embodiment of FIG. 1A. In the embodiment of FIG. 1B, collimated light coupling 30b interconnects said RGB LED set 28 and end wall 20. Light collection means 30a and collimated light coupling 30b position their associated RGB LED set 28 in parallel, spaced apart relation to left end wall 20. In another embodiment, not depicted, light collection means 30a and collimated light coupling 30b are eliminated and RGB LED set 28 is mounted directly to end wall 20 with a small spacing therebetween.

Light from RGB LED set 28 is reflected from retardation and reflection film 15 and a portion of light entering each birefringent microlens 26a or 26b exits light guide 10 in the form of a polarized light output as indicated by the reference numeral 32 in FIG. 1A.

In this first embodiment, the width or thickness of light guide 10 tapers downwardly along its length and the density of microlenses 26a, 26b varies along said length due to the increasing distance from RGB LED set 28. As light rays at certain angles gradually exit the light guide along its length, it is advantageous to position front wall 12 and back wall 14 closer and closer together to adjust the angles of light rays inside light guide.

Polarized light 32 is extracted from light guide 10 by providing microlens structures 26a, 26b filled with anisotropic birefringent material on front wall 12 of said light guide 10 as aforesaid. Output light angular distribution along the length of light guide 10, which corresponds to the horizontal direction of an LCD display, is controlled by these linear microlens structures 26a, 26b and the refractive index difference of the birefringent material. Input light, i.e., light from RGB LED set 28, is reflected inside light guide 10 in accordance with total internal reflection (TIR) theory before it is extracted as S polarization with a predetermined angular distribution. This eliminates the need for polarization and angular recycling components such as Vikuiti™ DBEF and one (1) BEF for horizontal view angle control. The spacing, i.e., density and size of microlens structures 26a, 26b determines the brightness uniformity along the length of light guide 10. Accordingly, as depicted in FIG. 1, the microlenses 26a, 26b that are closer to the RGB LED set 28 can be spaced further apart from one another than those microlenses 26a, 26b that are closer to the end of the light guide. A diffuser film, such as a holographic diffuser, may provide more uniform light incident on the LCD display. Moreover, the linear nature of the microlens structures 26a, 26b controls the angular distribution of light in only one direction, i.e., the horizontal direction of the LCD display. Accordingly, an additional feature is introduced to eliminate the need for a BEF for orthogonal direction angle management by collimating the LED light with coupling structures.

Figure 2A:
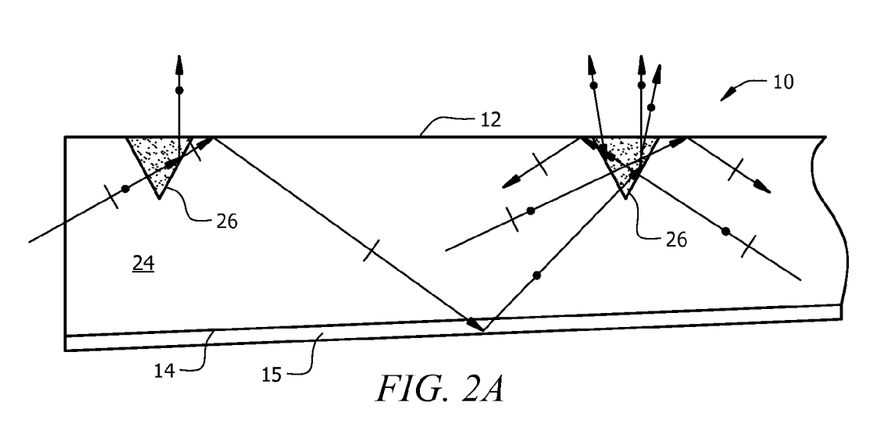
FIG. 2A is an enlarged top plan view of a section of the tapered light guide of FIG. 1A.
Figure 2B:
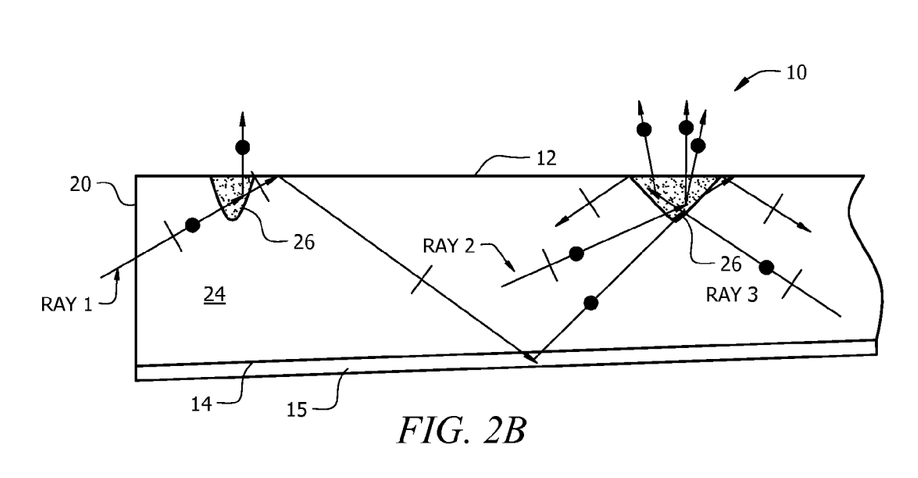
FIG. 2B is an enlarged top plan view of a section of the tapered light guide of FIG. 1B.

FIGS. 2A and 2B are enlargements, respectively, of a section of the light guide depicted in FIGS. 1A and 1B and said FIGS. 2A and 2B includes ray traces that indicate how light travels within said respective light guides 10.

More particularly, FIGS. 2A and 2B help explain how the polarized light is extracted out from light guide 10. Input beam Ray 1 has both S and P polarization states. Its polarization states are separated when it hits microlens structure 26a or 26b which is filled with birefringent material as aforesaid. The refractive index of the birefringent material is much higher than the refractive index of acrylic light guide 10 and much higher in one direction than the refractive index of ordinary rays which is about the same as the refractive index of the acrylic light guide.

Light in the S-polarization state is total-internally reflected at the microlens structure interface and exits light guide 10, but light in the P-polarization state is propagated along the length of the light guide and is denoted Ray 1a in FIG. 2A. Said Ray 1a is converted into S-polarization light after it is reflected by quarter waveplate (QWP) retardation and back reflection film 15. S-polarized Ray 1b exits light guide 10 when it hits birefringent structure 26 on the right-hand side of FIG. 2A as drawn.

The non-polarized input light from RGB LED light source 28 exits light guide 10 at a controllable cone angle so that the brightness is enhanced in the normal direction of an LCD display.

In accordance with the same principle, light in the S-polarization state from Ray 1☐ exits light guide 10 and its P-polarization state light is converted into S-polarization state light after it is reflected by QWP and back reflection film 15. The right end of light guide 10 as drawn is also covered with said film 15 to minimize light leakage. Light reflected from said right end exits light guide 10 at microlens structure 26 at the right-hand end of FIG. 2A as drawn as represented by Ray 3.

The refractive indexes of the birefrigent material, the angle of micro-groove structures 26a, 26b and the curve of the groove surfaces are designed to optimize control of the extraction light angle for higher efficiency of light extraction at uniform light distribution along the length of said light guide.

Alternatively, by changing the refractive index of the birefringent materials, the TIR light can be reflected to back wall 14 of light guide 10 and then reflected back to illuminate the LCD panel as depicted in FIGS. 1A, 1B, 2A, and 2B. This spreads the light out more uniformly by increasing the optical path length.

The curved microlenses 26b of FIG. 2B are believed to scatter light much less than the sawtooth microlenses 26b of FIG. 2A, thereby reducing light loss and enhancing the efficiency of the light guide 10.

Figure 3A:
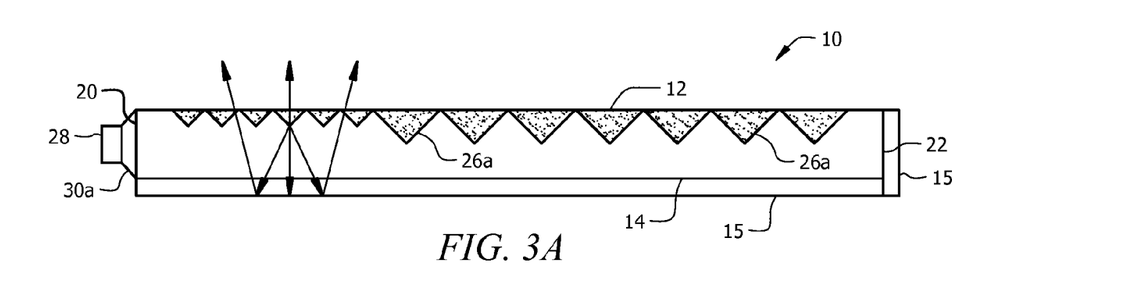
FIG. 3A is a top plan view of an alternative embodiment where the light guide is not tapered.
Figure 3B:
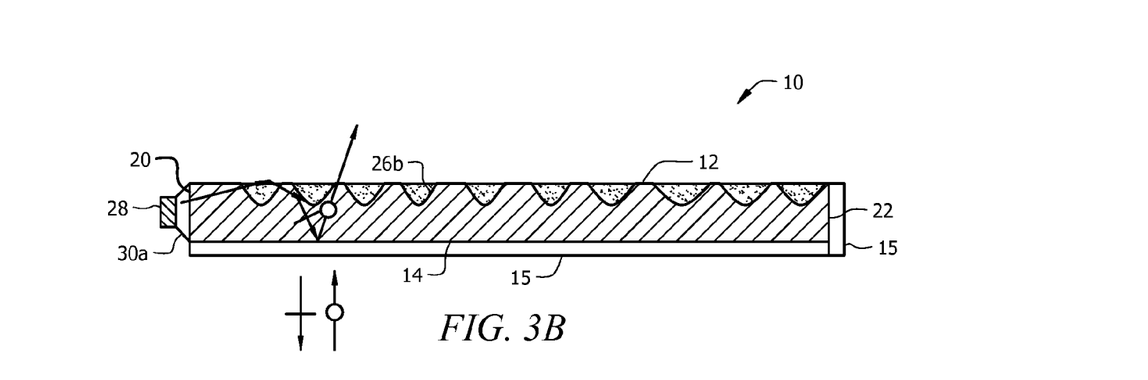
FIG. 3B is a top plan view of an alternative embodiment where the light guide is not tapered.

An alternative embodiment is depicted in FIGS. 3A and 3B. In this embodiment, front wall 12 and back wall 14 are in parallel relation to one another.

In the embodiment of FIG. 3A, a plurality of relatively small sawtooth micro-grooves 26a are positioned near the left end of light guide 10, i.e., closer to RGB LED set 28 and larger microlenses 26a are formed mid-length of the light guide and extend almost all the way to the right end thereof. In this particular embodiment, there is no spacing between contiguous small or large microlens. The ray traces indicate how a polarized light output is produced when light entering the left end of light guide 10 reflects from retardation and reflection film 15 and passes through sawtooth microlens 26a to produce a polarized light output.

In the embodiment of FIG. 3B, a plurality of relatively short-in-length curved microlenses 26b are positioned near the left end of light guide 10, i.e., closer to RGB LED set 28 and longer curved microlenses 26b are formed gradually almost all the way to the right end thereof. In this particular embodiment, there may be spacing or no spacing between contiguous small or large curved microlenses. The arrows indicate how a polarized light output is produced when light entering the left end of light guide 10 reflects from retardation and reflection film 15 and passes through curved microlenses 26b to produce a polarized light output.

Also in FIGS. 3A and 3B, RGB LED set 28 is spaced apart from end wall and light from said set 28 is directed to light guide 10 by light collection means 30.

Figure 4:
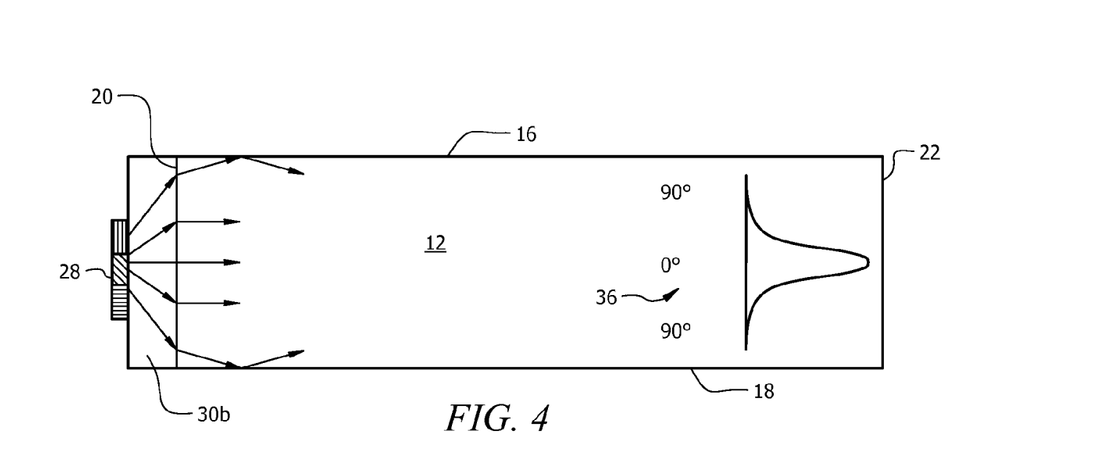
FIG. 4 is a diagrammatic front elevational view indicating the effect of a collimated light coupling between the LED set and the light guide.

A light guide 10 is depicted in front elevation in FIG. 4. Collimated light coupling module 30b is secured to end wall 20 of light guide 10 and the resulting light trace is indicated in said figure. Module 30b functions to collimate light before said light enters light guide 10. Light leaving guide 10 is indicated by reference numeral 36 which indicates a vertical angular light distribution.

More particularly, FIG. 4 depicts a generic collimated light coupling structure 30b for controlling the vertical view angle or vertical angular light distribution of an LCD display. When the LED beam is expanded into the height of light guide 10, the divergent angles of the LED light rays have been reduced.

FIGS. 5A-D depict specific collimated light coupling structures for collimating light before it enters light guide 10.

Figure 5A:
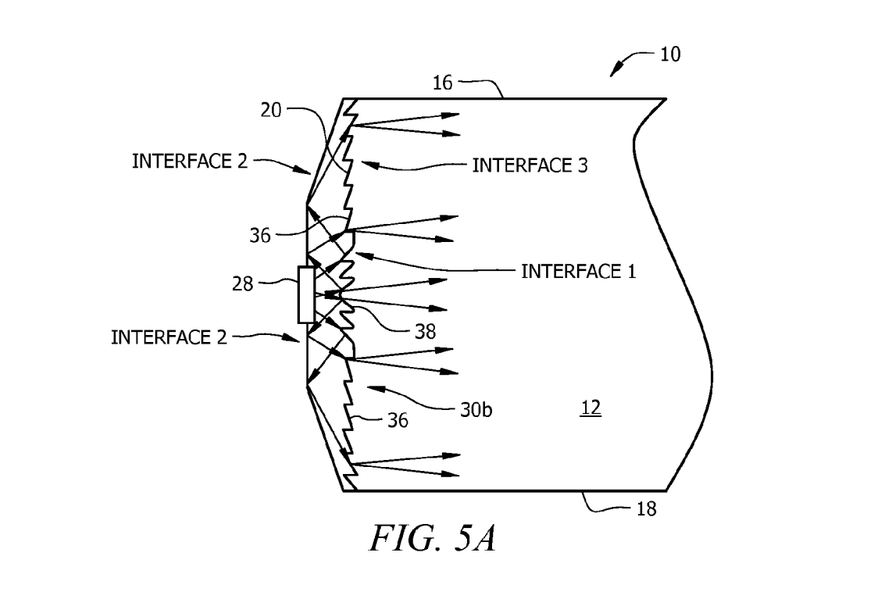
FIG. 5A is a diagrammatic front elevational view of an embodiment having a collimated light coupling between the LED set and the light guide as in FIG. 4 but depicting a first embodiment of a collimated light coupling.

In FIG. 5A, RGB LED set 28 is mounted in spaced relation to end wall 20 of light guide 10. RGB LED set 28 is connected by light collection means 30a to said end wall which in this embodiment is formed into faceted TIR and reflective structures 36, 38. Reflective structures 36 are generally sawtoothed as drawn and reflective structures 38 have a central convexity flanked by sawtoothed structures that are more rounded at the corners than structures 36.

Figure 5B:
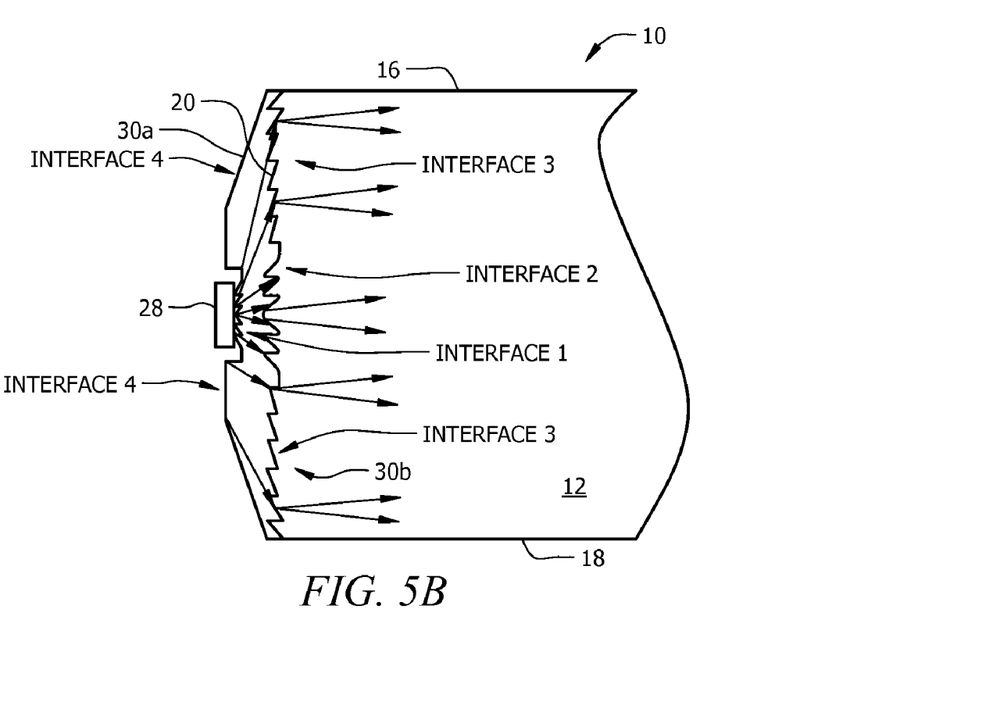
FIG. 5B is a front elevational view of an embodiment having a collimated light coupling between the LED set and the light guide as in FIG. 4 but depicting a second embodiment of a collimated light coupling.

In FIG. 5B, RGB LED set 28 is mounted in countersunk relation to light collection means 30a. The countersunk area has a central convexity flanked by sawtooth-shaped surfaces that are mirror images of each other on opposite sides of said central convexity. End wall 20 is formed in the same way as in FIG. 5A.

Figure 5C:
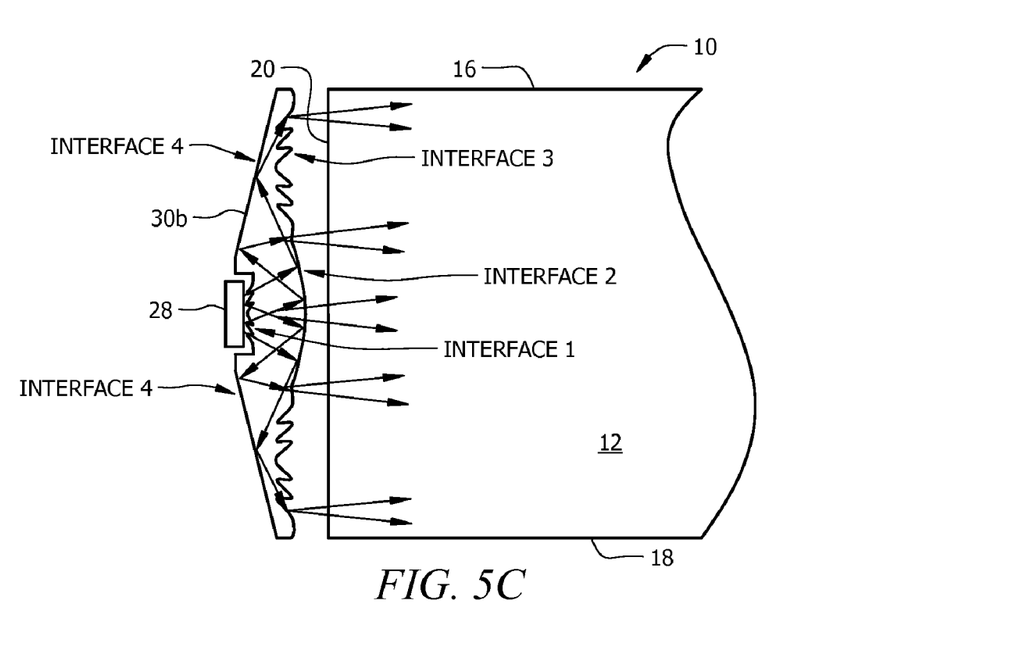
FIG. 5C is a front elevational view of an embodiment having a collimated light coupling between the LED set and the light guide as in FIG. 4 but depicting a third embodiment of a collimated light coupling.

In FIG. 5C, collimated light coupling lens 30b is spaced apart from end wall 20 of light guide 10, in parallel relation thereto. End wall 20 is flat and the reflective surfaces are formed on said collimated light coupling lens 30b.

Figure 5D:
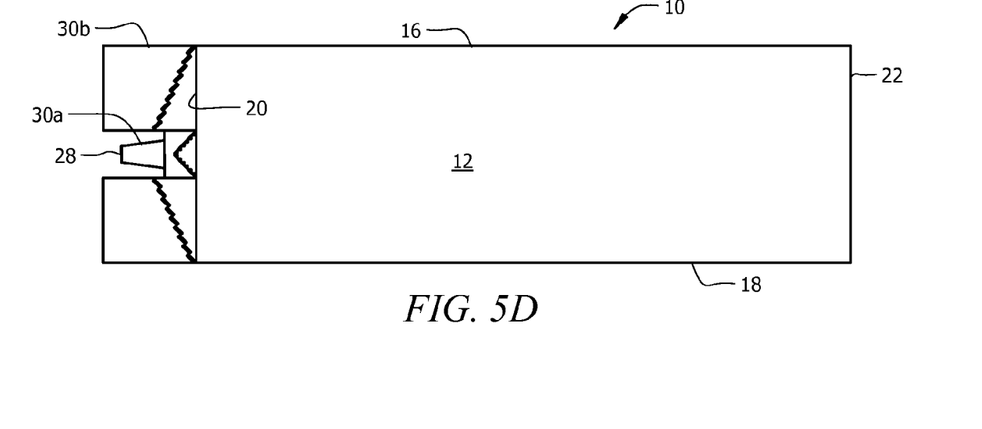
FIG. 5D is a front elevational view of an embodiment having a collimated light coupling between the LED set and the light guide as in FIG. 4 but depicting a third embodiment of a collimated light coupling.

The embodiment of FIG. 5D includes RGB LED set 28 that is placed very close to a light collector in the form of tapered tunnel 30a in the collimated light coupling 30b. Two triangular hole arrays are built into light guide 10 to split a portion of light exited from light collector 30a upwardly and downwardly by means of TIR and facetted mirrors, while a portion of light exited from said tapered tunnel passes through the apertures between those triangular holes into the light guide. The upward and downward light beams are then total-internally reflected into the light guide by means of two toroidal slit arrays.

More particularly, two TIR/reflective slit arrays are built into the light guide. The front surfaces of said TIR/reflective slits reflect and split a portion of incident light upwardly and downwardly. Other portions of incident light will pass through the spaces between the slit structures and go into the light guide to illuminate the center part of the light guide. Two toroidal lens (air) arrays are cut through the blade body. The front surfaces of those toroidal structures reflect and redirect, by means of TIR, light towards the light guide to fill the two sides of a wide blade. The light rays inside the light guide are collimated while good brightness and color uniformities are achieved within very short color mixing distance, resulting in a narrow bezel of the LCD display.

Figure 6:
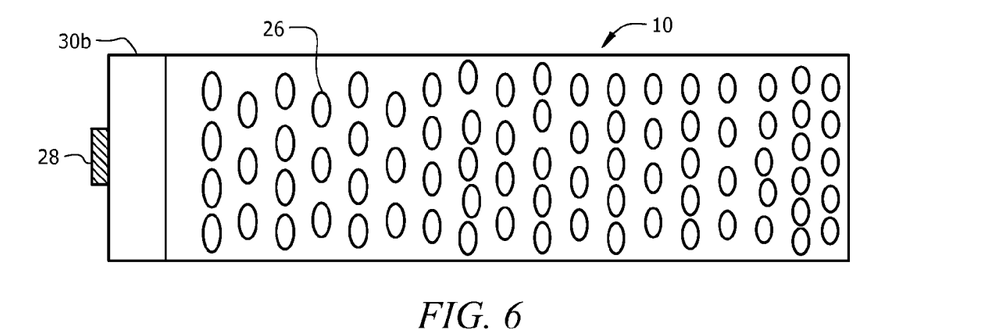
FIG. 6 is a front elevational view of a light guide having birefringent microlenses in elliptical form.
Figure 7:
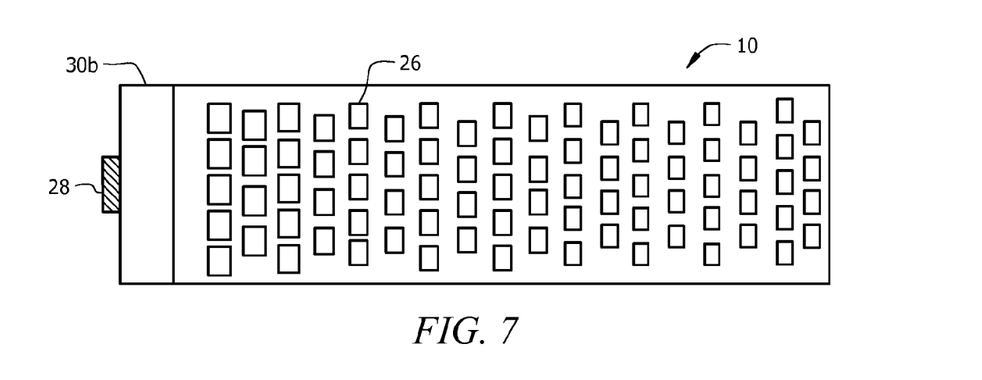
FIG. 7 is a front elevational view of a light guide having birefringent microlenses in rectangular form.
Figure 8:
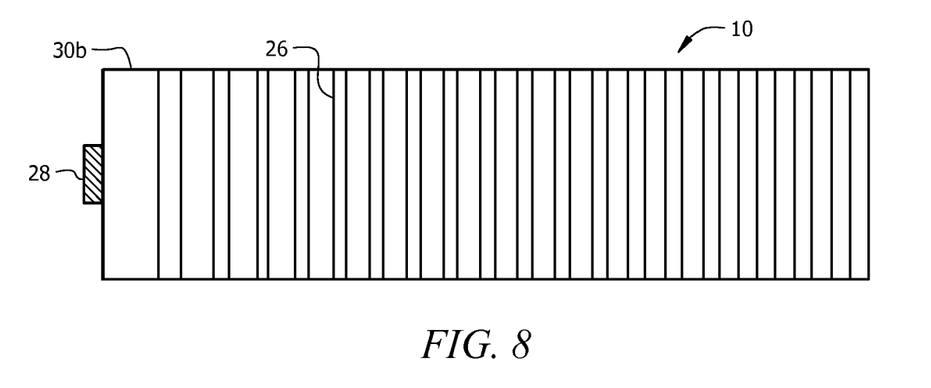
FIG. 8 is a front elevational view of a light guide having birefringent microlenses in lenticular form.

In FIG. 6, collimated light coupling module 30b interconnects RGB LED set 28 and light guide 10. The birefringent microlenses 26 are configured in elliptical form in this embodiment. They are configured in rectangular form in the embodiment of FIG. 7, and they are configured in lenticular form in the embodiment of FIG. 8.

FIGS. 9-15 are provided to explain how the novel light guides 10 are manufactured.

Figure 9:
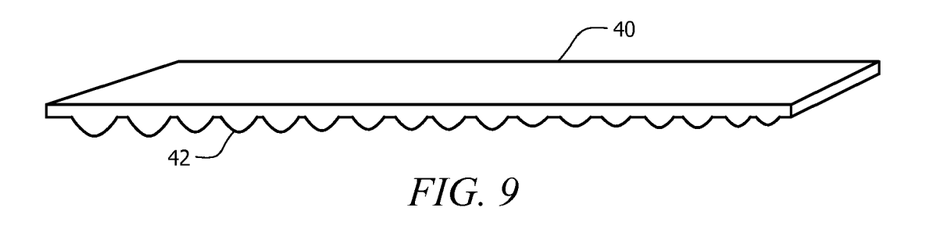
FIG. 9 is a perspective view of a steel plate having micro structures formed in a preselected surface.

FIG. 9 depicts steel plate 40 that is machined to form a plurality of convex micro structures 42 on a first surface thereof. Such steel plate is used to build the cavity of an injection mold. Convex microstructures 42 vary in size and space from a first end of the steel plate to a second end thereof.

Figure 10:
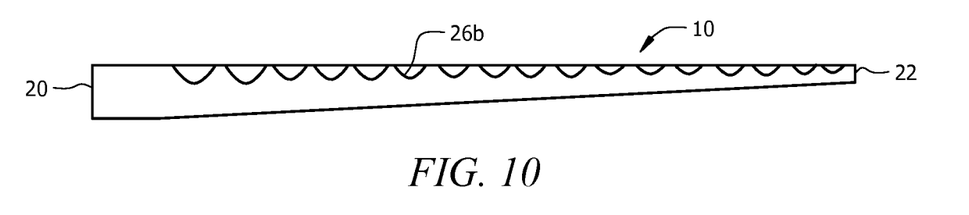
FIG. 10 is a top plan view of an injection molded light guide.

The light guide produced by such injection molding process is depicted in FIG. 10. Concave cavities 26b are created by convex microstructures 42 of steel plate 40.

Figure 11:
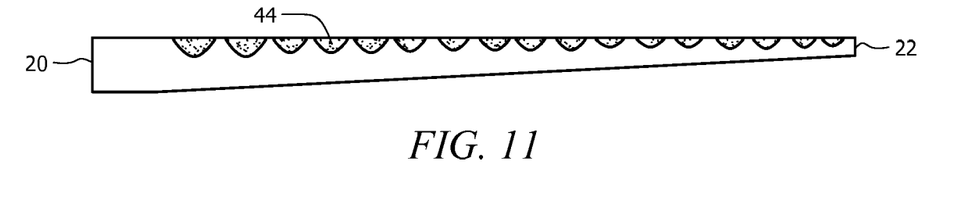
FIG. 11 is a view similar to that of FIG. 10 but with birefringent liquid crystal material disposed in the depicted micro profiles.

FIG. 11 adds birefringent liquid crystal materials 44 to concave cavities 26b of FIG. 10 to form birefringent microlenses.

Figure 12:
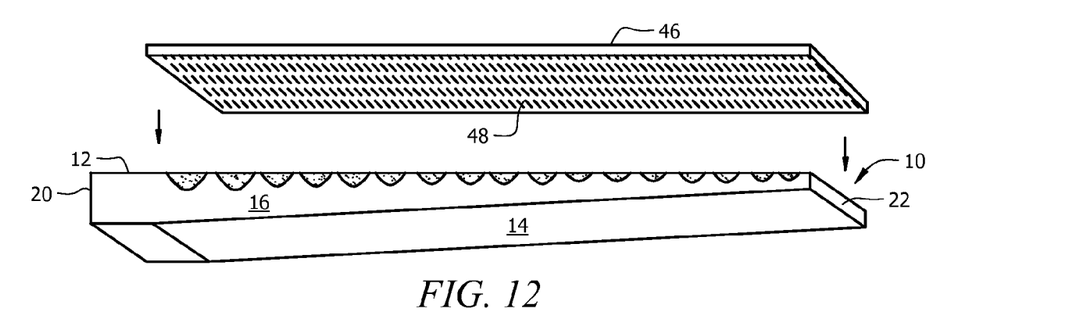
FIG. 12 is an exploded perspective view of a light guide and a cover plate with alignment ribbing.

Cover plate 46 having ribbing 48 formed in an underside thereof is then readied, as indicated in FIG. 12, for placement into overlying relation to front wall 12 of light guide 10 to align the molecules of the crystal liquid material.

Figure 13:
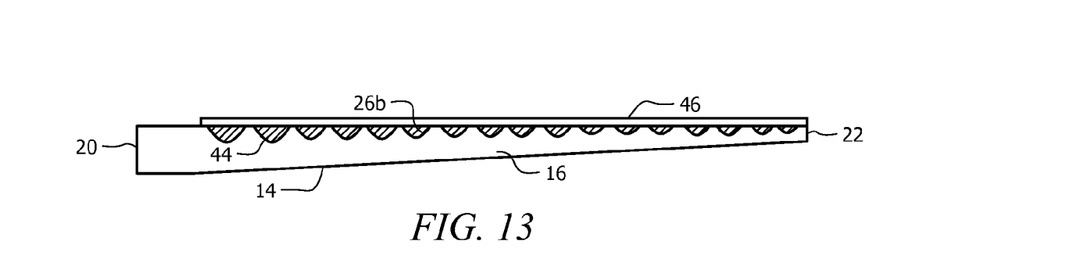
FIG. 13 is a top plan view of the parts depicted in FIG. 12 when said parts are assembled to one another with aligned liquid crystal molecules in birefringent microlenses.

FIG. 13 depicts said cover plate 46 when it is positioned into overlying relation to front wall 12. The molecules of liquid crystal material in birefringent microlens 44 are now aligned and polarized light guide is produced.

Figure 14:
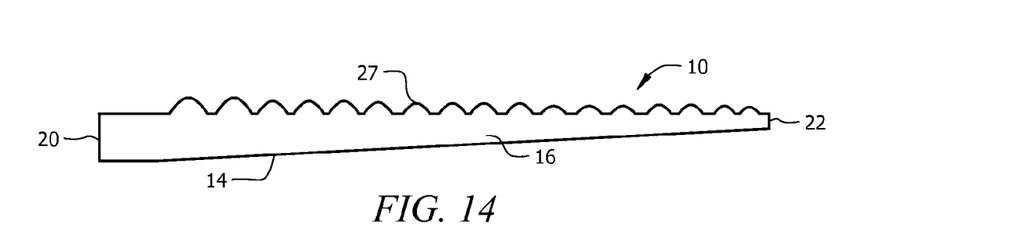
FIG. 14 is a view similar to that of FIG. 10 but depicting convex micro structures instead of concave micro structures.
Figure 15:
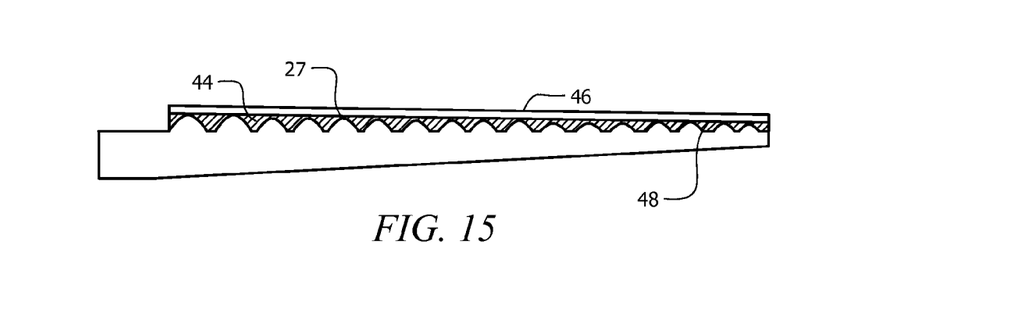
FIG. 15 is a view similar to that of FIG. 13 but with a liquid crystal layer and the convex micro structures of FIG. 14.

FIG. 14 depicts an injection molded light guide 10 having convex microstructures 27 instead of concave microstructures 26 and FIG. 15 depicts the light guide of FIG. 14 when cover plate 46 having ribbing 48 is disposed in overlying relation to liquid crystal material 44 to align the molecules of said liquid crystal material.

In addition to the many advantages already pointed out, it should also be noted that the novel designs reduce the bezeled area, i.e., the border area around the viewing screen, of an LCD display panel. In a very short longitudinal distance, light from the RGB LEDS travels through light collection means 30a, or collimated light coupling structure 30b, or both, and is thoroughly mixed before the viewing area is reached, i.e., the mixing occurs in the short bezeled area. This enables manufacturers to maximize the viewing area and to minimize the bezeled area.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A backlighting apparatus for a flat panel LCD display, comprising:
   an elongate light guide having a six-faced polyhedron structure;
   said elongate light guide having a front wall through which travels polarized light in a direction toward said LCD display;
   an LED set positioned adjacent a first end wall of said elongate light guide so that light enters said light guide from said first end wall;
   a plurality of microlenses formed in said front wall along its extent; and
   each microlens of said plurality of microlenses being filled with a birefringent material having molecules aligned in a particular direction;
   whereby light emitted by said LED set travels from said first end of said light guide to said second end of said light guide and is constrained to travel out of said light guide through said birefringent microlenses in a direction toward said LCD display;
   whereby said light traveling toward said LCD display is polarized.

2. The apparatus of claim 1, further comprising:
   said LED set being spaced apart from said first end wall of said light guide; and
   a light collector means having a light-reflecting interior surface extending from said LED set to said first end wall to constrain light emitted from said LED set to enter into said guide plate at said first end wall.

3. The apparatus of claim 1, further comprising:
   a collimated light coupling disposed between said LED set and said first end wall of said light guide so that light traveling the length of said light guide is collimated.

4. The apparatus of claim 1, further comprising:
   said elongate light guide having a back wall disposed in oblique relation to said front wall so that a first end of said back wall is further from said front wall than is a second end of said back wall;
   a first end wall defining a maximum width of said light guide and a second end wall defining a minimum width of said light guide.

5. The apparatus of claim 1, further comprising:
   said elongate light guide having a back wall disposed in parallel relation to said front wall so that said six-faced polyhedron is a parallelepiped.

6. The apparatus of claim 1, further comprising:
a retardation and reflection film disposed in covering relation to an external surface of a bottom wall and to an external surface of a second end wall that is parallel or angled to and longitudinally spaced from said first end wall.

7. The apparatus of claim 1, further comprising:
said microlenses being smaller and spaced apart with respect to one another at said second end of said light guide, remote from said LED set, than at said first end of said light guide;
whereby said width of said light guide decreases and the density of said micro-grooves varies as the distance along said light guide increases from said LED set.

8. The apparatus of claim 1, further comprising:
each of said microlenses having a sawtooth configuration.

9. The apparatus of claim 1, further comprising:
each of said microlenses having a curved configuration.

10. A backlighting apparatus for a flat panel LCD display, comprising:
an elongate light guide having a six-faced polyhedron structure;
said elongate light guide having a front wall through which travels polarized light in a direction toward said LCD display;
an RGB LED set positioned adjacent a first end wall of said elongate light guide so that light enters said light guide from said first end wall;
a plurality of microlenses formed in said front wall along its extent; and
each microlens of said plurality of microlenses being filled with a birefringent material having molecules aligned in a particular direction;
whereby light emitted by said RGB LED set travels from said first end of said light guide to said second end of said light guide and is constrained to travel out of said light guide through said birefringent microlenses in a direction toward said LCD display;
whereby said light traveling toward said LCD display is polarized.

11. The apparatus of claim 10, further comprising:
said RGB LED set being spaced apart from said first end wall of said light guide; and
a light collector means having a light-reflecting interior surface extending from said RGB LED set to said first end wall to constrain light emitted from said RGB LED set to enter into said guide plate at said first end wall.

12. The apparatus of claim 10, further comprising:
a collimated light coupling disposed between said RGB LED set and said first end wall of said light guide so that light traveling the length of said light guide is collimated.

13. The apparatus of claim 10, further comprising:
said elongate light guide having a back wall disposed in oblique relation to said front wall so that a first end of said back wall is further from said front wall than is a second end of said back wall;
a first end wall defining a maximum width of said light guide and a second end wall defining a minimum width of said light guide.

14. The apparatus of claim 10, further comprising:
said elongate light guide having a back wall disposed in parallel relation to said front wall so that said six-faced polyhedron is a parallelepiped.

15. The apparatus of claim 10, further comprising:
a retardation and reflection film disposed in covering relation to an external surface of a bottom wall and to an external surface of a second end wall that is parallel or angled to and longitudinally spaced from said first end wall.

16. The apparatus of claim 10, further comprising:
said microlenses being smaller and spaced apart with respect to one another at said second end of said light guide, remote from said RGB LED set, than at said first end of said light guide;
whereby said width of said light guide decreases and the density of said micro-grooves varies as the distance along said light guide increases from said RGB LED set.

17. The apparatus of claim 10, further comprising:
each of said microlenses having a sawtooth configuration.

18. The apparatus of claim 10, further comprising:
each of said microlenses having a curved configuration.

* * * * *